United States Patent Office 3,326,868
Patented June 20, 1967

3,326,868
SELF-CURING, OIL-RESISTANT COPOLYMERS CONTAINING ALKOXYALKYL ACRYLATES AND N-ALKOXYALKYL ACRYLAMIDES
Harold A. Tucker, Parma Heights, Ohio, assignor to The B. F. Goodrich Company, New York, N.Y., a corporation of New York
No Drawing. Filed Aug. 26, 1963, Ser. No. 304,645
13 Claims. (Cl. 260—80.5)

This invention relates to heat curable acrylate rubbers having good oil resistance and good low temperature properties and more particularly relates to a self-curing rubbery interpolymer, prepared in an aqueous emulsion system, which interpolymer is comprised of a major portion of an alkoxyethyl acrylate and a minor amount of an N-alkoxymethyl acrylamide.

It is well known that the physical and chemical properties of acrylate rubbers are improved by vulcanization (curing). The usual agents employed for the vulcanization of natural rubber and the synthetic diene rubbers are sulfur or sulfur-supplying organic compounds. In the case of the polyacrylates which are completely saturated, however, it has been necessary to find new types of vulcanization systems.

Of the numerous methods which have been discovered and employed for the vulcanization of rubbery acrylic ester polymers, the one most favored is that of incorporating active curing sites into the polymer's structure. Accordingly, one method often used is that of copolymerizing the acrylate ester with a small amount of an unsaturated chlorine containing monomer. The rubbery copolymer may then be vulcanized with polyamino compounds, which are toxic, and auxiliary agents such as sulfur or inorganic bases. These elastomers have the disadvantage of causing corrosion of various metals, especially iron and iron-containing alloys. It also is known that acrylate rubbers may be rendered self- and heat-curable by incorporating into the polymer small amounts of N-methylol acrylamide and/or methacrylamide to serve as potential cure sites therein. But these interpolymers are not completely satisfactory as they are excessively crosslinked during their preparation (indicated by high gel contents) and are prone to premature curing (scorching), which characteristic causes difficulties in processing.

There has also been a need in the trade for a self-curing acrylic ester rubber which not only is relatively resistant to deterioration after contacting oils for extended periods at elevated temperatures but which also has outstanding low-temperature properties, that is, the rubber will retain its flexibility, resilience, impact resistance and general usefulness at very low temperatures, e.g., at least as low as $-10°$ C. and frequently as low as $-40°$ C. This is a unique combination of properties which imparts a highly desirable versatility of uses to a rubber product possessing same.

It is therefore the object of the present invention to provide new polyacrylate rubbers which are free of the aforesaid disadvantages of the polyacrylate rubbers known heretofore and which, in addition, have good oil resistance and low-temperature properties.

The compositions of this invention are rubbery interpolymers obtained by polymerizing, in aqueous emulsion, a mixture of monomers comprising (a) 50 to 99.8% of an alkoxyethyl acrylate selected from the group consisting of methoxyethyl acrylate and ethoxyethyl acrylate, (b) 0 to 40% of one or more rubber-producing lower-alkyl esters of acrylic (or methacrylic acid) containing oxygen atoms only in the ester linkage

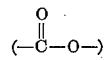

which esters are characterized by the ability to form homopolymers having second-order transition temperatures which are lower than about 10° C., (c) 0 to 20% of acrylonitrile, (d) 0.2 to 2.5% of an N-substituted alkoxymethyl acrylamide or methacrylamide and (e) 0 to 3.8% of a monoolefinically and terminally unsaturated amide containing at least one hydrogen on the amide nitrogen and wherein the olefinic unsaturation is alpha-beta to the carbonyl group of the amide and the remainder of the molecule consists only of carbon and hydrogen atoms, said percents being by weight and based on the total weight of the monomeric mixture, the total of the (d) and (e) constituents not exceeding about 4%. It is understood, of course, that when a maximum amount of one monomer is employed in the polymerization mixture, the relative proportions of the other monomers must necessarily be adjusted within their said ranges so that the combined weight percentage of monomers used in any single polymer will total 100%.

The interpolymers of this invention are self-curable rubbers in which the curing process is promoted by the application of heat thereto, advantageously catalyzed by acid containing substances, and further, without the need for other external vulcanization agents. They yield cured elastomers which have outstanding properties with respect to oil resistance, oil-aging and low temperature flexibility; they have good thermal stability and air-aging characteristics, and fair tensile strength, elongation and compression set. The rubbers are further characterized by decreased tendency to precure (scorch) and generally by low gel contents, e.g., usually less than about 10% by weight. These two latter said properties are responsible for their good processing and milling characteristics. The rubbers also have improved precure shelf life. Moreover, a delayed action cure is attainable; for example, the rubber may be milled for thirty minutes or more at 150° F. without any appreciable curing thereof, and yet will cure in 10 to 30 minutes at 350° F. The elastomers are non-corrosive toward metals with which they might come in contact, provided reasonable care has been taken in their manufacture to restrict the amount of contaminants therein.

The alkoxyethyl acrylate which is the major constituent of the interpolymers of this invention may be represented by the structure

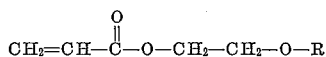

where R is an alkyl radical selected from the group consisting of methyl and ethyl. Ethoxyethyl acrylate is preferred because latices of its interpolymers are the more stable emulsions. As aforementioned, the interpolymer contains at least 50% by weight of the alkoxyethyl acrylate, but the more preferred amount thereof is at least about 70%.

The interpolymers may contain from 0 to 40% by weight of one or more lower acrylic esters which are characterized in that their homopolymers are rubbers having a second-order transition temperature that is below 10° C. The temperature at which a polymer changes from a rubbery solid to a brittle substance (the "glass" state), i.e., when it will not tolerate appreciable deformation without fraction, is usually referred to as the "second-order transition temperature" or "glass temperature," and generally is designated by the symbol Tg. Details on measuring the second-order transition temperature of polymers and the ramifications of this value are given in the books "Principles of Polymer Chemistry," Paul J. Flory, Cornell University Press, Ithica, New York, 1953, pages 52–53 and 56–57, and in "Monomeric Acrylic Esters," E. H. Riddle, Reinhold Publishing Corp., New York, N. Y., 1954, pages 59–60.

The acrylic esters which may be included in the interpolymers embodied herein in conjunction with the essential alkoxyethyl acrylate and N-alkoxymethyl acrylamide, are copolymerizable therewith and are chosen to modify certain physical characteristics of the acrylate rubber such as hardness or high temperature performance. As stated above, they are selected from the class of acrylic esters that form homopolymers having a glass temperature less than about 10° C., preferably at least 0° C., and the glass temperature may be as low as −70° C. Such acrylic esters have oxygen atoms only in the ester linkage and include those derivatives of acrylic acid represented by the structure

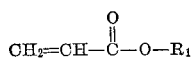

wherein $R_1$ is a member of the class consisting of alkyl groups having from 1 to 12 carbon atoms, preferably 2 to 8 carbon atoms, the beta-cyano ethyl radical and cyano alkyl groups having from 4 to 12 carbon atoms, preferably 4 to 8, and those derivatives of methacrylic acid represented by the structure

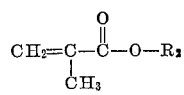

wherein $R_2$ is an alkyl group selected from those containing from 5 to 14 carbon atoms. Representative, suitable, acyclic, lower-alkyl acrylic esters are methyl acrylate, ethyl acrylate, the propyl acrylates, the butyl acrylates, the amyl acrylates, the hexyl acrylates, the heptyl acrylates, the octyl acrylates, e.g., n-octyl and 2-ethylhexyl acrylate, decyl acrylate, and lauryl acrylate; the rubber-producing cyanoalkyl acrylates, the polymers of which have second order transition temperatures less than 10° C., such as beta cyano ethyl acrylate having the structure

the alpha, beta and gamma-cyano propyl acrylates, the cyanobutyl acrylates, the cyanoamyl acrylates, the cyanohexyl acrylates, the cyanoheptyl acrylates and the like, and the amyl, the hexyl, the heptyl, and the octyl methacrylates, decyl methacrylate, lauryl methacrylate and myristyl methacrylate. The most preferred optional acrylic esters are ethyl acrylate, butyl acrylate and β-cyano ethyl acrylate.

The interpolymers embodied herein may contain from 0 to 20% by weight of a copolymerized acrylonitrile. The preferred acrylonitrile content is from about 5 to about 15%. This constituent serves to increase the tensile strength, hardness and oil resistance of the rubbers.

The monoolefinically unsaturated amides which may be incorporated in the interpolymers of this invention in minor proportions, i.e., 0 to 3.8 weight percent, have at least one hydrogen on the amide nitrogen and the olefinic unsaturation is alpha-beta to the carbonyl group. The preferred amides have the structure

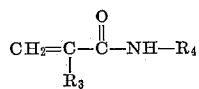

wherein $R_3$ is a member of the group consisting of hydrogen and an alkyl group having from 1 to 4 carbon atoms and $R_4$ is a member of the group consisting of hydrogen and an alkyl group having from 1 to 6 carbon atoms. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide.

The essential, polymerizable N-alkoxymethyl acrylamide embodied herein, and uitilized in very minor proportions, i.e., 0.2 to 2.5 percent by weight of the interpolymer, has the structure

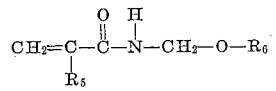

wherein $R_5$ is selected from the group consisting of hydrogen and methyl, and $R_6$ is an alkyl group having from 1 to 8 carbon atoms. It is thus intended that where references are made herein regarding the essential N-substituted alkoxy-methyl amides, the term "acrylamide" includes "methacrylamide" within its meaning. The preferred alkoxymethyl acrylamides are those wherein $R_6$ is an alkyl group containing from 2 to 5 carbon atoms and most preferred is N-butoxymethyl acrylamide.

The N-alkoxymethyl acrylamide may be referred to as a "reactive monomer" as it imparts the self-curing characteristics to the interpolymer. The amount of this key constituent permitted in the interpolymer is critical. There must be at least 0.2%, but if it is present in excess of about 2.5% by weight, the resulting elastomer has inadequate elongation. The aforementioned, non-essential amide component, exemplified by acrylamide and methacrylamide, is also a "reactive monomer" which may be included to promote faster curing of the elastomeric interpolymer and also to yield a product having higher tensile strength, better elongation, better permanent set and high temperature aging properties. The total of the reactive monomers, that is, the amide plus the N-alkoxymethyl acrylamide, is critical and should not exceed about 4% of the interpolymer composition. If greater amounts are present, the ultimate elongation of the cured elastomer (vulcanizate) is unacceptable.

The N-alkoxymethyl acrylamides embodied herein are lower alkyl ether derivatives of N-methylol acrylamide. Their advantages as a self-curing component in acrylate rubbers are surprising and unexpected when a comparison with similar rubbers containing the hydroxymethyl amide self-cure monomer is made. The elastomers of this invention generally have low gel content, indicating relatively little cross-linked structures. Their scorch properties are markedly better, permitting a controllable cure rate. This enables the material to be compounded, molded and cured by conventional processing methods. Excellent high-temperature aging properties are inherent in elastomers having this highly compatible "built-in" cure system.

The preferred method for preparing the N-alkoxymethyl amide involves a direct etherification of the N-hydroxymethyl acrylamide (N-methylol acrylamide or N-methylol methacrylamide) by reaction with a monohydric alcohol, $R_6OH$, where $R_6$ has the designation given above. The alcohol is employed in stoichiometric excess, at least 2 mols per mol of the starting unsaturated hydroxymethyl amide. A small amount of an acid catalyst is used, such as sulfonic acid or p-toluene sulfonic acid, and a small amount of polymerization inhibitor is included in the mixture, for example, pyrogallol or the hydroquinones. The reaction is depicted below:

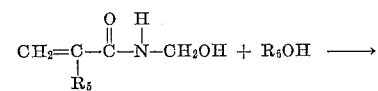

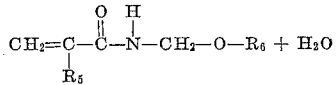

wherein the R's have the designations previously assigned thereto. In order to obtain high yields, the water of reaction is removed by azeotropic distillation employing well known azeotropic agents such as benzene or toluene. Consequently, the etherification is desirably carried out at the reflux temperature of the particular system, preferably at about atmospheric pressure.

Other methods for obtaining the N-alkoxymethyl substituted unsaturated amides are described in detail in U.S.

Patents No. 3,079,434 and No. 3,087,965, which disclosures are hereby incorporated by reference into this specification. Briefly, the process of the earlier patent involves reacting an unsaturated amide such as acrylamide with a stoichiometric excess of formaldehyde and an excess of a monohydric alcohol of the structure $R_6OH$ wherein $R_6$ has the designation given above, at a pH in the range of about 3 to 6 and in the presence of a polymerization inhibitor. In effect, the method is a one step procedure for converting the amide into the N-methylol amide which in turn undergoes the etherification reaction depicted above. In the process of the later patent, the methylolation (formaldehyde condensation) of the amide is carried out in the presence of a very minimum amount of the alcohol or another suitable solvent, and after this reaction is completed, the remaining amount of required alcohol is added to the reaction medium for the subsequent etherification.

The N-alkoxymethyl acrylamide suitable for use as the essential self-curing component in the interpolymers of this invention should be substantially free of contaminants, for example, unreacted acrylamide and undesired by-products formed during the reaction, such as the methylene bis-acrylamides and other harmful difunctional products. An unreasonable amount of these impurities causes undue cross-linking in the interpolymers and high gel contents therein. More than about 0.3 wt. percent of the said impurities in the N-alkoxymethyl acrylamide monomer cannot be tolerated. Most of the contaminants are more water soluble than the alkoxymethyl amide product, and water washing generally provides a sufficiently pure material. An extremely pure N-alkoxymethyl acrylamide can be obtained by a low pressure distillation operation. This procedure may be expedient when it is desired to produce self-curing elastomers having the best properties.

The rubbery polymers embodied herein are obtained by polymerizing the aforedescribed monomeric mixture in emulsified aqueous medium that desirably contains a free radical catalyst which may be of the water-soluble type or of the monomer-soluble class. Suitable free-radical initiators include the persulfates, oxides, the peroxides, hydroperoxides, azo compounds, the redox catalysts, and the like, such as potassium persulfate, hydrogen peroxide, benzoyl peroxide, tert-butyl peroxide, caprylyl peroxide, cumene hydroperoxide, potassium perphosphate, diisopropylpercarbonate, azobisisobutyronitrile, and others. The alkyl borane-peroxide catalyst systems disclosed in U.S. Patent No. 3,025,284 and the copending U.S. Patent applications of Paul J. George et al., Ser. Nos. 733,255 and 733,265, filed May 6, 1958 and both now abandoned, give good results. It is understood that the above list of catalysts is merely illustrative and is not to be taken as limitative since any free-radical-generating catalyst is operable, including various forms of actinic radiation such as ultra-violet light and X-rays. However, the preferred catalysts are the well known redox systems. The free radical catalyst concentration ranges from about 0.01 to 0.2 part per 100 parts by weight of monomers with from about 0.05 to 0.1 part being most preferred.

The reaction mixture normally contains on the order of about 80 to 150 parts of water and about 0.1 to 2.5 parts of a conventional emulsifying agent per 100 parts by weight of monomers. The pH of the system generally is not higher than about 7.5 and normally not less than about 4. The emulsifier may be anionic, cationic or non-ionic; however, the anionic type is preferred. Representative anionic emulsifiers are sodium stearate, potassium laurate, morpholine oleate, sodium lauryl sulfate, sodium 2-ethyl hexyl sulfate, sodium xylene sulfonate, the sodium alkyl benzene sulfonates, sodium naphthalene sulfonate, sodium alkyl naphthalene sulfonate, sodium sulfosuccinate, sodium oleic acid sulfonate, sodium castor oil sulfonate, glycerol monostearate containing a sodium fatty alcohol sulfate, glycerol monostearate containing a soap, and the like. Representative cationic emulsifying agents include the long chain quaternary salts such as cetyltriethylammonium chloride, the alkyl dimethylbenzylammonium chlorides, and the like. Nonionic emulsifiers include the polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, polyhydric alcohol fatty acid di-, tri-, etc. esters, chloesterol and fatty acid esters, oxidized fatty oils, and the like. Of course, the above listed emulsifying agents are merely illustrative and not limitative.

The temperature of polymerization may be within the range of from about $-10°$ C. to $40°$ C., with from 0 to $10°$ C. being preferred. High temperatures, i.e., greater than about $40°$ C., tend to cause the formation of unsuitable lower molecular weight polymers. When temperatures below $0°$ C. are employed, it is advantageous to add a small amount of an anti-freeze agent to the emulsion to prevent the formation of ice in the mixture and coagulation of the latex. When an anti-freeze is used, up to a maximum of about 25 parts of anti-freeze agent per 100 parts of water are sufficient, the required amount depending on the reaction temperature. This procedure is well known to those skilled in the art. Care must be taken, however, that the anti-freeze agent, in general a low-freezing point organic liquid miscible with water, is not a good chain transfer agent which will promote the formation of a low-molecular weight polymer. Operable, representative anti-freeze additives are ethylene glycol and ethanol.

Conventional polymerization operating procedures may be used in the production of the interpolymers. Stated differently, either the batch-charging technique or the more preferred monomers metering method may be employed. The latter method comprises initiating polymerization with only a small amount (e.g., 1 to 10%) of the total monomeric mixture in the reactor and adding the remainder incrementally or continuously as polymerization proceeds, either as an undiluted mixture or as a water-monomer emulsion. The reaction mixture is agitated to an extent which is sufficient to give a pumping and shear action that does not permit monomers to settle on the surface thereof nor permit the formation of areas of stagnation therein, but is not so vigorous as to cause instability and coagulation of the latex that is formed.

It is economically desirable to carry the polymerization to a 90 to 100% conversion. From about 30 minutes to two hours are required to attain such yields, depending, of course, on catalyst concentration and temperature. Subsequent to polymerization, the rubber is separated from the water by freeze coagulation or preferably by agglomeration with a conventional coagulating reagent, followed by filtration. Suitable coagulants for the latices are sodium chloride, calcium chloride, magnesium sulfate, calcium acetate and other similar electrolytes, or a lower monohydric alcohol such as methanol, ethanol, or isopropanol. The coagulation step is desirably carried out with vigorous agitation of the mixture so that the rubber is received as a fine, easily-handled crumb averaging from $\frac{1}{16}$ to $\frac{1}{4}$ inch in diameter. Impurities are leached therefrom by water-washing and the crumb is then dried.

It has been found that the interpolymers of the present invention cannot be prepared by solution polymerization. By "solution polymerization" is meant the use of an organic reaction medium which is a solvent for both the monomers and the product polymer. Rubbers of the present formulation which are produced in a solution system are such low molecular weight that they are either liquid polymers at room temperature or, if solid, are tacky, weak, or cheesy. Polymerization in bulk is also inoperative because the reaction is highly exothermic, and the heat so generated cannot be adequately removed in a diluentfree polymerization, making temperature control impossible.

As aforementioned, the novel polyacrylate rubbers produced in accordance with this invention are self-curing. In other words, it is not necessary to add any external vulcanization agent to the rubbers in order to promote curing, but internal vulcanization is brought about by simply heating the interpolymer, desirably in admixture with an acid catalyst. The curing reaction is not uncontrollably fast as is the case with most other self-curing interpolymers and the rate can be controlled to a large extent by adjusting the cure temperature (250 to 450° F.) and/or the strength and amount of the acid catalyst.

Acid catalyst concentration is generally from about 0 to 3 parts per 100 parts by weight of rubber, but when no catalyst is present, the rate of cure is very slow. Typical acid catalysts are butadiene sulfone, toluene sulfonic acid, morpholinium toluene sulfonate, salicylic acid, benzoic acid, stearic acid and the like. In lieu of an acid catalyst as such, an acidic carbon black or acidic clay filler can be used as a compounding ingredient.

The raw polymer is compounded with the curing catalyst and other well-known rubber compounding agents such as fillers, pigments, lubricants and the like in a conventional rubber mixing apparatus such as a roll-mill or Banbury mixer operated at from about 70 to 250° F. It has been found necessary to add a small amount of a rubber anti-oxidant to the interpolymer during its compounding to insure that the elastomer retains its good properties during subsequent service. Any of the well-known stabilizers employed to protect rubbers against oxidative degradation may be used, provided they are not strongly basic since basic compounds would react with the acid curing catalyst. Suitable antioxidants are the phenolic type such as 2,6-di-tert-butyl-p-cresol, 2,2'-methylenebis (4-methyl-6-tert-butylphenol), 1,5-dihydroxynaphthalene, 4,4' - thiobis(3 - methyl-6-tert-butylphenol) and the like; the primary aromatic amines, the alkylated and aralkylated diphenyl amines and the phenyl-1 and 2-naphtyl amines such as toluene-2,4-diamine, N,N'-diphenylethylenediamine, p,p'-diaminodiphenyl methane, p,p' - dioctyl diphenylamine, phenyl - β-naphthylamine, phenyl-α-naphthylamine and the like; the aldehyde-primary amine reaction products; the ketone reaction products of primary arylamines; and heterocyclics such as 2-mercaptobenzimidazole, and others. The above-named compounds are merely representative and many others may be found by referring to the extensive literature on rubber anti-oxidants, for instance, see the "Encyclopedia of Chemical Technology" by Kirk and Othmer, Interscience Encyclopedia, Inc., New York, N.Y., volume 2 (1948), pages 69–74, volume 11 (1953), pages 881–887, first supplement volume (1957), pages 85–86. The preferred antioxidants are the aromatic amine class. The amount of antioxidant required may vary from 0.5 part to 5 parts by weight per 100 parts of interpolymer, depending on the environment to which the elastomer product will be subjected. Normally, one to two parts per hundred are sufficient for ordinary service.

The principal advantage of the elastomers embodied in this invention is their combination of comparatively high oil resistance and good low temperature properties. The cured rubbers retain a large measure of their desirable mechanical properties and exhibit comparatively low swell after extensive immersion in or contact with hot oils. The elastomer is suitable for applications wherein it may meet any of a great variety of oils such as the hydrocarbon oils, e.g., the mineral oils, fuel oils, lubricants and like products derived from petroleum; the fixed oils and non drying oils which consist of the fatty substances of vegetable and animal organisms, e.g., those containing the esters (usually the glycerol esters) of fatty acids, such as castor oil and sperm oil; the drying oils and essential oils, e.g., linseed oil, tung oil, the terpenes and the like.

With regard to the elastomers' cold resistance, it has been found that they retain their rubbery characteristics at quite low temperatures, e.g., somewhere in the range of $-10°$ C. to $-40°$ C., depending on the particular composition. "Cold resistance" means the resistance of rubber specimens to bending, twisting, and impact at low temperatures.

Illustrative examples and specific embodiments are next presented to clarify the invention and to point out the improved combination of properties of the elastomers produced according to this invention. The examples illustrate the synthesis of the interpolymers, the compounding and curing thereof, and various important physical properties. The symbol (—) in a table of properties indicates the measurement was not made. The amounts of ingredients used in the experiments are given in parts by weight unless otherwise indicated. The characterizations of the interpolymer were made and physical properties of the elastomers were determined according to the following procedures:

A. *Tests on uncompounded, uncured rubber*

The molecular weight of a polymer, which is ordinarily not easily or accurately determined, may be related to and defined by the *dilute solution viscosity* (*DSV*) which was determined herein by means of an Ostwald viscometer on a 0.2 percent by wt. solution of the interpolymer in toluene or a 0.4 percent by wt. solution in dimethyl formamide at 25° C. The DSV is calculated as the natural logarithm of the ratio of the flow time of the solution to the flow time of the pure solvent divided by the concentration of the polymer in grams per 100 ml. The DSV of the rubber embodied in this invention ranges from about 1 to 4 when determined in the toluene system and also from about 1 to 4, preferably 2 to 3, when measured in dimethyl formamide.

The *gel* contents of the rubbers, which indicate the degree of cross-linking therein, were determined by the following procedure: a 0.3 gram sample of the rubber (weighed to an accuracy of 0.0005 gram and cut into strips less than 1 mm. in thickness and about 5 mm. long) is placed on a screen in a weighing bottle containing 75 cc. of toluene or dimethyl formamide. The bottle is sealed and the sample is kept in the solvent for about 16 hours at 25° C. The cap is then removed from the bottle and the liquid containing the sol or soluble portion of the rubber is carefully siphoned. The amount of sol is determined by evaporating the solution thus recovered, or a portion thereof, to dryness in a tared dish. The fraction of gel, reported in percent, is calculated by subtracting the weight of sol from the weight of the original sample and dividing this result by the weight of the original sample.

*Mooney viscosity value:* a measure of the toughness and the processing characteristics of raw rubber by the Mooney shearing disk viscometer, reported as ML1–4 (212° F.)—ASTM D1646–59T.

B. *Tests on compounded, cured elastomer cold resistance*

(1) *Gehman freeze temperature.*—Measurement of the low-temperature stiffening of rubber using the Gehman torsional apparatus—ASTM D1053–58T.

(2) *Brittle point* (*brittleness temperature*).—The highest temperature in a series of low temperatures at which a rubber specimen fractures on sudden impact—ASTM D746–57T.

*Oil resistance:* swelling of elastomer in oil expressed as percent volume increase—ASTM D471–59T.

*Tensile strength* (ultimate) in lbs./sq. inch, *Modulus* at 100% and 300% elongation in lbs./sq. inch, and *Elongation* (ultimate) in percent—ASTM D412–51T.

*Hardness* in points, using durometer A—ASTM D676–59T.

*Mooney Scorch value:* time in minutes for specified rise in Mooney viscosity number at 250 to 300° F.; it indicates the tendency of rubbers to vulcanize or "set-up" during processing—ASTM D1646–59T.

For purposes of brevity in the tables of data, symbols are used to designate the various monomers used in preparing the interpolymers of the illustrative examples, in accordance with the following nomenclature.

MeOEtA _____ Methoxyethyl acrylate.
EtOEtA _____ Ethoxyethyl acrylate.
AC _____ Acrylamide.
MAC _____ Methacrylamide.
NBMA _____ N-n-butoxymethyl acrylamide.
MeA _____ Methyl acrylate.
EtA _____ Ethyl acrylate.
VCN _____ Acrylonitrile.

EXAMPLE I

A series of self-curing interpolymers were prepared using the following conventional emulsion polymerization recipe charged to quart "pop bottles" and tumbled in a constant temperature bath.

| | Parts |
|---|---|
| Monomer mixture | 100 |
| Water (distilled) | 200 |
| Sodium lauryl sulfate (emulsifier) | 3 |
| Sodium hydrosulfite (reducing agent) | 0.04 |
| Sodium formaldehyde sulfoxalate (reducing agent and accelerator) | 0.24 |
| p-Menthane hydroperoxide (catalyst) | 0.1 |
| Iron complex of organic chelating agent | 0.005 |
| Organic chelator | 0.03 |

The polymerization temperature was 5° C. High conversions were obtained in about 30 minutes. The latices were coagulated with vigorous stirring by adding methanol thereto; the rubber crumb was recovered by filtration, water washed, and dried at 30° C. in a vacuum oven. The compounding was performed on a laboratory roll-mill at 100 to 150° F. with this recipe:

| | Parts |
|---|---|
| Rubber | 100 |
| HAF (high abrasion furnace) carbon black | 50 |
| Acid curing catalyst, butadiene sulfone | 0.3 |
| or |  |
| Stearic acid | 1.0 |
| p,p'-Dioctyl diphenylamine | 2.0 |

The monomers and proportions thereof in the monomer mixture, and the results of physical tests performed on the compounded and cured rubber are presented in Table A. Elastomer specimens were cured for 45 minutes at 350° F. in a rubber press and then heat tempered for 24 hours at 300° F. After the heat-tempering, the samples were subjected to the heat-air aging or the hot oil immersion tests as shown in the table.

TABLE A

| Sample | Monomer Mixture, Parts | | | | Polymerization Conversion, Percent | Raw Rubber, DSV* | Curing Catalyst, Parts | | Physical Properties of Compounded, Cured Elastomer | | | | |
|---|---|---|---|---|---|---|---|---|---|---|---|---|---|
| | EtOEtA | VCN | NBMA | MAC | | | Stearic Acid | Butadiene Sulfone | After 45 minutes in press at 350° F. | | | | |
| | | | | | | | | | 100% Mod. | 300% Mod. | Ult. tensile | Ult. Elongation | Hardness |
| 1a | 98 | 0 | 2 | 0 | 86.5 | 1.44 | 1.0 | ------ | 90 | ------ | 130 | 145 | 40 |
| 1b | | | | | | | ------ | 0.3 | 225 | ------ | 425 | 200 | 50 |
| 2a | 96.9 | 0 | 2 | 1.1 | 93.7 | ------ | 1.0 | ------ | 385 | ------ | 510 | 135 | 60 |
| 2b | | | | | | | ------ | 0.3 | 440 | ------ | 465 | 120 | 65 |
| 3a | 96.4 | 0 | 2 | 1.6 | 89.3 | ------ | 1.0 | ------ | 200 | ------ | 590 | 270 | 50 |
| 3b | | | | | | | ------ | 0.3 | 500 | ------ | 675 | 150 | 65 |
| 4a | 93 | 5 | 2 | 0 | 96.2 | 1.38 | 1.0 | ------ | 40 | 210 | 460 | 645 | 40 |
| 4b | | | | | | | ------ | 0.3 | 225 | ------ | 650 | 295 | 50 |
| 5a | 91.9 | 5 | 2 | 1.1 | 95.1 | ------ | 1.0 | ------ | 110 | 560 | 850 | 480 | 50 |
| 5b | | | | | | | ------ | 0.3 | 260 | 1,110 | 1,260 | 345 | 55 |
| 6a | 91.4 | 5 | 2 | 1.6 | 93.3 | ------ | 1.0 | ------ | 150 | 630 | 1,000 | 455 | 50 |
| 6b | | | | | | | ------ | 0.3 | 300 | 1,165 | 1,260 | 340 | 55 |
| 7a | 89 | 9 | 2 | 0 | 95.4 | 1.35 | 1.0 | ------ | 80 | 210 | 425 | 785 | 49 |
| 7b | | | | | | | ------ | 0.3 | 115 | 430 | 980 | 625 | 53 |
| 8a | 87.9 | 9 | 2 | 1.1 | 93.8 | ------ | 1.0 | ------ | 75 | 320 | 990 | 720 | 50 |
| 8b | | | | | | | ------ | 0.3 | 190 | 910 | 1,360 | 425 | 55 |
| 9a | 87.4 | 9 | 2 | 1.6 | 92.7 | ------ | 1.0 | ------ | 110 | 515 | 1,120 | 590 | 55 |
| 9b | | | | | | | ------ | 0.3 | 200 | ------ | 1,430 | 460 | 61 |

| Sample | Physical Properties of Compounded, Cured Elastomer | | | | | | | | | |
|---|---|---|---|---|---|---|---|---|---|---|
| | Tempered 24 hours at 300° F. | | | | | | Aged 3 days in air at 350° F. | | | |
| | Gehman Freeze Temp., °C. | 100% Mod. | 300% Mod. | Ult. Tensile | Ult. Elong. | Hardness | 100% Mod. | Ult. Tensile | Ult. Elong. | Hardness |
| 1a | −37 | 330 | ------ | 390 | 150 | 60 | ------ | 300 | 60 | 66 |
| 1b | −39 | 400 | ------ | 460 | 120 | 64 | ------ | 400 | 85 | 70 |
| 2a | −37.5 | ------ | ------ | 520 | 85 | 70 | ------ | 475 | 75 | 82 |
| 2b | −37 | ------ | ------ | 580 | 90 | 71 | ------ | 500 | 95 | 75 |
| 3a | −37 | 610 | ------ | 900 | 155 | 67 | ------ | 650 | 105 | 78 |
| 3b | −37 | 955 | ------ | 955 | 100 | 65 | ------ | 550 | 100 | 75 |
| 4a | −34 | 205 | 880 | 1,190 | 405 | 60 | 400 | 1,000 | 275 | 70 |
| 4b | −33 | 445 | ------ | 780 | 180 | 65 | 550 | 725 | 165 | 70 |
| 5a | −32 | 500 | ------ | 1,340 | 245 | 70 | 700 | 1,150 | 180 | 80 |
| 5b | −32 | 520 | ------ | 1,445 | 225 | 70 | 700 | 1,280 | 180 | 80 |
| 6a | −32 | 465 | ------ | 1,245 | 215 | 70 | 700 | 1,100 | 155 | 80 |
| 6b | −32 | 610 | ------ | 1,480 | 210 | 70 | 600 | 1,200 | 210 | 77 |
| 7a | −26.5 | 300 | 930 | 1,300 | 420 | 65 | 525 | 1,280 | 250 | 76 |
| 7b | −26.5 | 340 | 1,210 | 1,540 | 400 | 65 | 700 | 1,390 | 200 | 80 |
| 8a | −26.5 | 355 | ------ | 1,600 | 290 | 68 | 725 | 1,490 | 190 | 80 |
| 8b | −23.5 | 480 | ------ | 1,580 | 250 | 68 | 800 | 1,225 | 165 | 80 |
| 9a | −22.5 | 510 | ------ | 1,575 | 245 | 70 | 900 | 1,360 | 160 | 85 |
| 9b | −24 | 600 | ------ | 1,905 | 260 | 75 | 950 | 1,250 | 135 | 85 |

TABLE A.—Continued

| Sample | Physical Properties of Compounded, Cured Elastomer | | | | | |
|---|---|---|---|---|---|---|
| | After 3 days at 300° F. in ASTM No. 3 Oil | | | | | |
| | 100% Mod. | 300% Mod. | Ult. Tensile | Ult. Elong. | Hardness | Volume Swell, Percent |
| 1a | 50 | | 210 | 200 | 41 | 24 |
| 1b | 110 | | 300 | 200 | 55 | 21.6 |
| 2a | 275 | | 390 | 160 | 46 | 20.5 |
| 2b | 290 | | 350 | 110 | 45 | 20.2 |
| 3a | 310 | | 625 | 180 | 45 | 20.9 |
| 3b | 375 | | 525 | 140 | 46 | 19.5 |
| 4a | 90 | 450 | 925 | 500 | 35 | 18.6 |
| 4b | 260 | | 680 | 280 | 40 | 18.2 |
| 5a | 250 | 1,075 | 1,160 | 340 | 45 | 16.8 |
| 5b | 275 | 1,190 | 1,230 | 310 | 45 | 15.8 |
| 6a | 225 | 1,125 | 1,160 | 310 | 49 | 16.0 |
| 6b | 210 | 1,175 | 1,210 | 310 | 48 | 15.6 |
| 7a | 90 | 460 | 960 | 520 | 40 | 13.7 |
| 7b | 210 | 790 | 1,230 | 470 | 44 | 13.5 |
| 8a | 175 | 1,060 | 1,410 | 400 | 45 | 12.7 |
| 8b | 210 | 1,220 | 1,220 | 300 | 50 | 12.5 |
| 9a | 225 | 1,210 | 1,390 | 350 | 50 | 11.9 |
| 9b | 310 | 1,450 | 1,510 | 310 | 55 | 12.5 |

*In 0.2% toluene solution.

EXAMPLE II

Interpolymers comprised of 83 to 98 parts of ethoxyethyl acrylate, 0 to 15 parts of acrylonitrile and 2 parts of N-butoxymethyl acrylamide were prepared in the emulsion polymerization system and compounded essentially as described in Example I, with 50 parts of HAF carbon black, 2 parts of antioxidant and either 2 parts of stearic acid or 0.24 part of butadiene sulfone per 100 parts of polymer. The data and results are tabulated in Table B.

EXAMPLE III

The interpolymers of this example were comprised of methoxyethyl acrylate, acrylonitrile and N-butoxymethyl acrylamide. The data are given in Table C. The polymerization recipe and procedure and compounding technique were substantially the same as in Example I, except that in all instances the curing catalyst was 0.3 part of butadiene sulfone per 100 parts of rubber.

TABLE B

| Sample | Monomer Mixture, Parts | | | Polymerization Conversion, Percent | Raw Rubber | | Curing Catalyst, Parts | |
|---|---|---|---|---|---|---|---|---|
| | EtOEtA | VCN | NBMA | | DSV* | Gel, Percent | Stearic Acid | Butadiene Sulfone |
| 10a, 10b | 98 | 0 | 2 | 92.4 | 3.02 | 0 | 2 | 0.24 |
| 11a, 11b | 93 | 5 | 2 | 84.7 | 3.43 | 0 | 2 | 0.24 |
| 12a, 12b | 88 | 10 | 2 | 91.7 | 2.96 | 0 | 2 | 0.24 |
| 13a, 13b | 83 | 15 | 2 | 92.4 | 1.93 | 0 | 2 | 0.24 |

| Sample | After 45 minutes in press at 350° F. | | | Tempered 24 hours at 300° F. | | | | | |
|---|---|---|---|---|---|---|---|---|---|
| | Ult. Tensile | Ult. Elong. | Hardness | 100% Mod. | 300% Mod. | Ult. Tensile | Ult. Elong. | Hardness | Gehman Freeze Temp., °C. |
| 10a | 175 | 280 | 40 | 350 | | 650 | 195 | 53 | −36.5 |
| 10b | 400 | 295 | 43 | 350 | | 750 | 200 | 55 | −37.5 |
| 11a | 200 | 900 | 40 | 200 | 1,000 | 1,300 | 385 | 50 | −32 |
| 11b | 400 | 700 | 40 | 150 | 800 | 1,150 | 415 | 50 | −32 |
| 12a | 200 | 895 | 50 | 200 | 1,300 | 1,800 | 410 | 56 | −25 |
| 12b | 400 | 860 | 48 | 100 | 900 | 1,525 | 480 | 57 | −24 |
| 13a | 125 | 725 | 58 | 250 | 1,300 | 1,975 | 460 | 56 | −17 |
| 13b | 250 | 850 | 60 | 200 | 900 | 1,650 | 525 | 58 | −17.5 |

| Sample | Aged in 3 days in air at 350° F. | | | | After 3 days at 300° F. in ASTM No. 3 Oil | | | | | |
|---|---|---|---|---|---|---|---|---|---|---|
| | 100% Mod. | Ult. Tensile | Ult. Elong. | Hardness | 100% Mod. | 300% Mod. | Ult. Tensile | Ult. Elong. | Hardness | Volume Swell, Percent |
| 10a | 150 | 500 | 85 | 67 | 150 | | 500 | 260 | 35 | 22.3 |
| 10b | 425 | 575 | 160 | 65 | 100 | | 500 | 280 | 35 | 22.9 |
| 11a | 400 | 1,100 | 210 | 70 | 50 | 400 | 875 | 470 | 30 | 18.2 |
| 11b | 325 | 1,100 | 290 | 66 | 200 | 560 | 850 | 540 | 34 | 17.6 |
| 12a | 600 | 1,550 | 220 | 77 | 100 | 625 | 1,200 | 510 | 44 | 13.2 |
| 12b | 500 | 1,475 | 250 | 77 | 100 | 490 | 890 | 440 | 40 | 13.4 |
| 13a | 750 | 1,725 | 220 | 85 | 100 | 525 | 1,300 | 590 | 37 | 10.9 |
| 13b | 750 | 1,525 | 190 | 81 | 60 | 475 | 1,125 | 560 | 50 | 10.2 |

*In 0.2% toluene solution.

TABLE C

| Sample | Monomer Mixture, Parts | | | Raw Rubber | |
|---|---|---|---|---|---|
| | MeOEtA | VCN | NBMA | DSV* | Gel, percent |
| 14 | 98 | 0 | 2 | 2.01 | <5 |
| 15 | 95.5 | 2.5 | 2 | 2.33 | <5 |
| 16 | 93.0 | 5 | 2 | 1.92 | <5 |
| 17 | 90.5 | 7.5 | 2 | 1.48 | 0 |
| 18 | 88 | 10 | 2 | 1.00 | 0 |

TABLE C.—Continued

| Sample | Physical Properties of Compounded, Cured Elastomer | | | | | | | | | | |
|---|---|---|---|---|---|---|---|---|---|---|---|
| | After 45 minutes in press at 350° F. | | | | | Tempered 24 hours at 300° F. | | | | | |
| | 100% Mod. | 300% Mod. | Ult. Tensile | Ult. Elong. | Hardness | Gehman Freeze Temp., °C. | 100% Mod. | 300% Mod. | Ult. Tensile | Ult. Elong. | Hardness |
| 14 | 50 | 100 | 325 | 670 | 45 | −35 | 225 | 825 | 975 | 340 | 60 |
| 15 | | | 225 | 400 | 60 | −31.5 | 400 | | 750 | 280 | 70 |
| 16 | 50 | 200 | 600 | 900 | 50 | −26.5 | 200 | 1,250 | 1,950 | 450 | 55 |
| 17 | 100 | 300 | 450 | 900 | 50 | −25.5 | 200 | 1,175 | 2,025 | 415 | 62 |
| 18 | 100 | | 250 | 1,040 | 60 | −21.5 | 300 | 1,250 | 2,100 | 515 | 68 |

| Sample | Physical Properties of Compounded, Cured Elastomer | | | | | | | | | |
|---|---|---|---|---|---|---|---|---|---|---|
| | Aged in 3 days in air at 350° F. | | | | After 3 days at 300° F. in ASTM No. 3 Oil | | | | | |
| | 100% Mod. | Ult. Tensile | Ult. Elong. | Hardness | 100% Mod. | 300% Mod. | Ult. Tensile | Ult. Elong. | Hardness | Volume Swell, Percent |
| 14 | 400 | 900 | 235 | 55 | 50 | 250 | 550 | 540 | 35 | 9.9 |
| 15 | 600 | 700 | 155 | 74 | 200 | 325 | 400 | 430 | 45 | 9.0 |
| 16 | 475 | 1,725 | 305 | 60 | 100 | 575 | 1,200 | 540 | 40 | 8.0 |
| 17 | 525 | 1,930 | 310 | 61 | 125 | 625 | 1,550 | 610 | 45 | 7.6 |
| 18 | | 2,000 | 265 | 71 | 175 | 700 | 1,600 | 600 | 50 | 7.0 |

*In 0.2% toluene solution.

EXAMPLE IV

A series of self-curing interpolymers were made using the following emulsion polymerization recipe.

| | Parts |
|---|---|
| Monomer mixture | 100 |
| Water | 100 |
| Emulsifier (anionic) | 2.3 |
| Iron complex of organic chelating agent | 0.02 |
| Organic hydroperoxide | 0.07 |
| Reducing agent | 0.07 |
| Electrolyte (NA$_2$SO$_4$) | 0.2 | the several monomers and the amounts thereof forming the various mixtures of monomers are shown in Table D.

The polymerization procedure was as follows: 55 parts of water, 0.5 part of the emulsifying agent, and the electroyle and catalyst were charged into the polymerization vessel which was maintained under a blanket of nitrogen. An emulsion comprised of the monomers and the remaining water and emulsifier was prepared in another vessel. 5% of this emulsified mixture was added to the reactor, and after a temperature rise therein indicated the initiation of polymerization, the remainder was proportioned in over a two hour period. The temperature of polymerization was from about 20 to 30° C. The conversions of monomer to polymer averaged about 97%.

The latex was coagulated by adding it to a 10% NaCl solution with violent agitation. The rubber crumb was recovered by filtration, water washed, and dried in a vacuum oven at 200 to 200° F. Several physical tests were performed on specimens of the raw rubber.

The low gel-content, oil-resistant rubber was compounded on a roll mill at about 70 to 200° F. for 20 minutes employing the following recipe:

| | Parts |
|---|---|
| Rubber | 100 |
| FEF (fast extruding furnace) carbon black | 40 |
| Stearic acid | 1 |
| p,p'-Dioctyl diphenyl amine | 2 |

The results of physical testing on the compound and cured elastomers also are presented in Table D. Low temperature brittle points were −33 to −36° C. after about a 3 hour cure at 350° F. and after 70 hours of air aging at 350° F., the brittle points had risen to only −25 to −29° C.

TABLE D

| Sample | Monomer Mixture, Parts | | | | | | Raw Rubber | | Physical Properties of Compounded, Cured Elastomer | | |
|---|---|---|---|---|---|---|---|---|---|---|---|
| | EtOEtA | EtA | MeA | VCN | NBMA | AC | DSV* | GEL, Percent | Mooney Viscosity | Mooney Scorch Value at 300° F. | |
| | | | | | | | | | | Δ5 points | Δ30 points |
| 19 | 92.8 | | | 5.0 | 1.2 | 1.0 | 2.93 | 3.9 | 14 | >30 | |
| 20 | 92.4 | | | 5.0 | 1.6 | 1.0 | 2.20 | 2.6 | 11 | 21 | >30 |
| 21 | 72.6 | 25.0 | | | 1.4 | 1.0 | 1.87 | 1.5 | 10 | 15 | >30 |
| 22 | 82.6 | | 15.0 | | 1.4 | 1.0 | 1.45 | | 12 | 16 | >30 |

TABLE D.—Continued

| Sample | Physical Properties of Compounded, Cured Elastomer | | | | Aged 70 hours in air at 350° F.—Brittle Point, ° C. |
|---|---|---|---|---|---|
| | 10 minutes at 350° F. in press and tempered 3 hours at 350° F. | | | | |
| | Ult. Tensile | Ult. Elong. | Hardness | Brittle Point, ° C. | |
| 19 | 850 | 500 | 37 | −34 | −29 |
| 20 | 950 | 400 | 42 | −36 | −25 |
| 21 | 850 | 360 | 39 | −35 | −28 |
| 22 | 900 | 440 | 43 | −33 | −29 |

*In 0.4% dimethyl formamide solution.

EXAMPLE V

In this experiment the polymerization recipe was the same as in the preceding example. The monomer mixture was comprised of 91.9 parts of ethoxyethyl acrylate, 5 parts of acrylonitrile, 2 parts of N-butoxymethyl acrylamide and 1.1 parts of methacrylamide. The afore-described monomers metering method was used in preparing the rubber. The reaction temperature was about 22 to 28° C. and a 96% conversion was obtained. 100 parts of the dry rubber was compounded at 70 to 200° F. with 50 parts of HAF carbon black, 2 parts of p'p-dioctyl diphenyl amine and either 1.0 part of stearic acid or 0.3 part of butadiene sulfone. The results of the physical characterizations of the cured elastomers are found in Table E.

TABLE E

| Sample | Curing Catalyst, Parts | | Physical Properties of Compounded, Cured Elastomer | | | | | | | | |
|---|---|---|---|---|---|---|---|---|---|---|---|
| | | | 45 minutes in press at 300° F. | | | | Tempered 24 hours at 300° F. | | | | |
| | Stearic Acid | Butadiene Sulfone | 100% Mod. | Ult. Tensile | Ult. Elong. | Hardness | Gehman Freeze Temp., ° C. | Brittle Point, ° C. | 100% Mod. | Ult. Tensile | Ult. Elong. | Hardness |
| 23 | 1.0 | | 270 | 1,000 | 290 | 62 | −31 | −27 | 420 | 1,150 | 210 | 65 |
| 24 | | 0.3 | 380 | 1,350 | 240 | 62 | −31 | −27 | 560 | 1,500 | 190 | 70 |

| Sample | Physical Properties of Compounded, Cured Elastomer | | | | | | | | |
|---|---|---|---|---|---|---|---|---|---|
| | After 70 hours in air at 350° F. | | | | After 70 hrs. at 300° F. in ASTM No. 3 Oil | | | | |
| | 100% Mod. | Ult. Tensile | Ult. Elong. | Hardness | 100% Mod. | Ult. Tensile | Ult. Elong. | Hardness | Volume Swell, Percent |
| 23 | 950 | 950 | 100 | 83 | 240 | 950 | 270 | 52 | 14 |
| 24 | | 800 | 60 | 83 | 390 | 1,150 | 240 | 52 | 14 |

It is to be understood that the foregoing examples are not limiting but are merely illustrative of the invention, and various modifications thereof may be made by one skilled in the art without departing from the spirit and scope of the invention, as defined by the appended claims.

I claim:

1. A heat-curable acrylate interpolymer rubber comprising (A) 50 to 99.8 percent by weight of an alkoxyethyl acrylate selected from the group consisting of methoxyethyl acrylate and ethoxyethyl acrylate; (B) 0 to 40 percent by weight of at least one rubber producing acrylic ester containing oxygen atoms only in the ester linkage, whose homopolymer has a glass temperature lower than about 10° C.; (C) 0 to 20 percent by weight of acrylonitrile; (D) 0.2 to 2.5 percent by weight of an N-substituted alkoxymethyl acrylamide represented by the structure $$CH_2=C-\underset{R_5}{\overset{O}{\overset{\|}{C}}}-\underset{H}{N}-CH_2-O-R_6$$

wherein $R_5$ is selected from the group consisting of hydrogen and methyl, and $R_6$ is an alkyl group having from 1 to 8 carbon atoms; and (E) 0 to 3.8 percent by weight of a monoolefinically and terminally unsaturated amide containing at least one hydrogen on the amide nitrogen and wherein the olefinic unsaturation is alpha-beta to the carbonyl group of the amide and the remainder of the molecule consists only of carbon and hydrogen atoms, the total of the (D) and (E) components in the interpolymer not exceeding 4 percent by weight.

2. A heat-curable acrylate interpolymer rubber comprising (A) 50 to 99.8 percent by weight of an alkoxyethyl acrylate represented by the structure $$CH_2=CH-\overset{O}{\overset{\|}{C}}-O-CH_2-CH_2-O-R$$

where R is an alkyl radical selected from the group consisting of methyl and ethyl; (B) 0 to 40 percent by weight of at least one acrylic ester selected from the group consisting of: acrylates represented by the structure $$CH_2=CH-\overset{O}{\overset{\|}{C}}-O-R_1$$

wherein $R_1$ is an alkyl radical having from 1 to 12 carbon atoms, cyano alkyl radicals having from 4 to 10 carbon atoms and the beta-cyano ethyl radical; and methacrylates represented by the structure $$CH_2=C-\underset{CH_3}{\overset{O}{\overset{\|}{C}}}-O-R_2$$

wherein $R_2$ is an alkyl radical having from 5 to 14 carbon atoms; (C) 0 to 20 percent by weight of acrylonitrile; (D) 0.2 to 2.5 percent by weight of an N-substituted alkoxymethyl acrylamide represented by the structure $$CH_2=C-\underset{R_5}{\overset{O}{\overset{\|}{C}}}-\underset{H}{N}-CH_2-O-R_6$$

wherein $R_5$ is selected from the group consisting of hydrogen and methyl and $R_6$ is an alkyl radical having from 1 to 8 carbon atoms; and (E) 0 to 3.8 weight percent of a monoolefinically unsaturated amide selected from the group consisting of acrylamide and methacrylamide, the total of the (D) and (E) components in the interpolymer not exceeding 4 weight percent.

3. The composition according to claim 2 wherein there is at least about 70 weight percent of the alkoxyethyl acrylate, and the N-substituted alkoxymethyl acrylamide is N-butoxymethyl acrylamide.

4. A heat-curable acrylate interpolmer rubber comprising (A) 50 to 99.8 percent by weight of ethoxyethyl acrylate; (B) 0 to 40 percent by weight of at least one acrylic ester selected from the group consisting of: acrylates represented by the structure

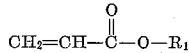

wherein $R_1$ is an alkyl radical having from 1 to 12 carbon atoms, cyano alkyl radicals having from 4 to 10 carbon atoms and the beta-cyano ethyl radical; and methacrylates represented by the structure

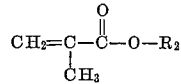

wherein $R_2$ is an alkyl radical having from 5 to 14 carbon atoms; (C) 5 to 15 percent by weight of acrylonitrile; (D) 0.2 to 2.5 percent by weight of N-butoxymethyl acrylamide; and (E) 0 to 3.8 weight percent of a monoolefinically unsaturated amide selected from the group consisting of acrylamide and methacrylamide, the total of the (D) and (E) components in the interpolymer not exceeding 4 weight percent.

5. A heat-curable acrylate interpolymer comprised of a major proportion of methoxyethyl acrylate or ethoxyethyl acrylate and 0.2 to 2.5% of an N-substituted alkoxymethyl acrylamide or methacrylamide.

6. A heat-curable acrylate interpolymer comprised of a major proportion of methoxyethyl acrylate or ethoxyethyl acrylate, 0.2 to 2.5% of an N-substituted alkoxymethyl acrylamide or methacrylamide and a monoolefinically and terminally unsaturated amide containing at least one hydrogen on the amide nitrogen wherein the olefinic unsaturation is alpha-beta to the carbonyl group of the amide and the remainder of the molecular consists only of carbon and hydrogen atoms, the total of the N-susbtituted alkoxymethyl acrylamide or methacrylamide and other unsaturated amide not exceeding 4% by weight.

7. A heat-cured rubbery acrylate interpolymer of claim 1.

8. A heat-cured rubbery acrylate interpolymer of claim 2.

9. A heat-cured rubbery acrylate interpolymer of claim 4.

10. A heat-cured rubbery acrylate interpolymer of claim 5.

11. A heat-cured rubbery acrylate interpolymer of claim 6.

12. A process for producing a rubbery heat-curable acrylate interpolymer, which interpolymer yields, after heat-curing, an oil-resistant and cold-resistant elastomer, comprising the steps of polymerizing in an aqueous medium, at a temperature within the range of about —10 to 40° C., in the presence of a free radical catalyst, a mixture of monomers comprising (A) 50 to 99.8 percent by weight of an alkoxyethyl acrylate represented by the structure

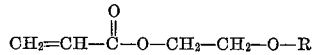

where R is an alkyl radical selected from the group consisting of methyl and ethyl; (B) 0 to 40 percent by weight of at least one acrylic ester selected from the group consisting of: acrylates represented by the structure

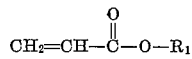

wherein $R_1$ is an alkyl radical having from 1 to 12 carbon atoms, cyano alkyl radicals having from 4 to 10 carbon atoms and the beta-cyano ethyl radical; and methacrylates represented by the structure

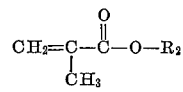

wherein $R_2$ is an alkyl radical having from 5 to 14 carbon atoms; (C) 0 to 20 percent by weight of acrylonitrile; (D) 0.2 to 2.5 percent by weight of an N-substituted alkoxymethyl acrylamide represented by the structure

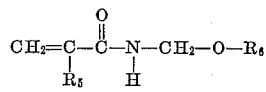

wherein $R_5$ is selected from the group consisting of hydrogen and methyl and $R_6$ is an alkyl radical having from 1 to 8 carbon atoms; and (E) 0 to 3.8 weight percent of a monoolefinically unsaturated amide selected from the group consisting of acrylamide and methacrylamide, the total of the (D) and (E) components in the mixture of monomers not exceeding 4 weight percent thereof.

13. The process according to claim 12 wherein the alkoxyethyl acrylate is ethoxyethyl acrylate, there is 5 to 15 weight percent of acrylonitrile in the mixture of monomers and the N-substituted alkoxymethyl acrylamide is N-butoxymethyl acrylamide, said polymerization being conducted in the presence of 80 to 150 parts of water per 100 parts of monomers and at a pH of about 4 to about 7.5.

References Cited
UNITED STATES PATENTS 2,565,259    8/1951    Nyquist _____ 260—86.1
3,079,434    2/1963    Christenson et al. ____ 260—80.5

JOSEPH L. SCHOFER, *Primary Examiner.*

W. HOOVER, *Assistant Examiner.*